United States Patent
Lu et al.

(10) Patent No.: US 11,095,729 B2
(45) Date of Patent: Aug. 17, 2021

(54) SERVICE DISCOVERY IN MULTI-MEDIUM COMMUNICATIONS NETWORKS

(71) Applicant: MediaTek Inc., Hsin-Chu (TW)

(72) Inventors: Kaiying Lu, San Jose, CA (US); Chao-Chun Wang, San Jose, CA (US); James Chih-shi Yee, San Jose, CA (US); Chien-Fang Hsu, Hsinchu (TW); Yu-Che Tsai, Hsinchu (TW)

(73) Assignee: MediaTek Inc., Hsin-Chu (TW)

(*) Notice: Subject to any disclaimer, the term of this patent is extended or adjusted under 35 U.S.C. 154(b) by 92 days.

(21) Appl. No.: 16/590,555

(22) Filed: Oct. 2, 2019

(65) Prior Publication Data
US 2020/0036801 A1    Jan. 30, 2020

Related U.S. Application Data

(63) Continuation-in-part of application No. 14/915,642, filed as application No. PCT/CN2015/086862 on Aug. 13, 2015, now Pat. No. 10,484,857.
(Continued)

(51) Int. Cl.
*H04L 29/08* (2006.01)
*H04W 4/70* (2018.01)
(Continued)

(52) U.S. Cl.
CPC .............. *H04L 67/16* (2013.01); *H04W 4/23* (2018.02); *H04W 4/70* (2018.02); *H04W 52/0235* (2013.01)

(58) Field of Classification Search
None
See application file for complete search history.

(56) References Cited

U.S. PATENT DOCUMENTS 10,484,857 B2    11/2019    Tsai et al.
2009/0029691 A1    1/2009    Shen et al.
(Continued)

FOREIGN PATENT DOCUMENTS

CA        2 892 372 A1    6/2014
CA        2 530 715 A1    3/2015
(Continued)

OTHER PUBLICATIONS

International Preliminary Report on Patentability dated Feb. 23, 2017 in connection with International Application No. PCT/CN2015/086862.
(Continued)

*Primary Examiner* — Chi H Pham
*Assistant Examiner* — Raul Rivas
(74) *Attorney, Agent, or Firm* — Wolf, Greenfield & Sacks, P.C.

(57) ABSTRACT

A management device accepts a first communications device to join a wireless communications network managed by the management device. The management device registers a service provided by the first communications device. The service is available in accordance with a set of service parameters. The set of service parameters include a schedule of availability. The set of service parameters include at least one parameter selected from the group consisting of a set of one or more starting times, a set of one or more service intervals, a set of one or more service periods, a set of one or more physical media, a set of one or more device identifiers, a set of one or more data sequence identifiers, and at least one medium access mode within the service interval.

21 Claims, 10 Drawing Sheets

Related U.S. Application Data

(60) Provisional application No. 62/037,117, filed on Aug. 14, 2014, provisional application No. 62/036,636, filed on Aug. 13, 2014.

(51) Int. Cl.
*H04W 4/23* (2018.01)
*H04W 52/02* (2009.01)

(56) References Cited

U.S. PATENT DOCUMENTS

| | | |
|---|---|---|
| 2009/0240794 A1 | 9/2009 | Liu et al. |
| 2009/0245133 A1 | 10/2009 | Gupta et al. |
| 2010/0322213 A1 | 12/2010 | Liu et al. |
| 2011/0239011 A1 | 9/2011 | Waris et al. |
| 2013/0322297 A1 | 12/2013 | Dominguez |
| 2014/0143839 A1 | 5/2014 | Ricci |
| 2016/0205533 A1 | 7/2016 | Tsai et al. |

FOREIGN PATENT DOCUMENTS

| | | |
|---|---|---|
| CN | 1823495 A | 8/2006 |
| CN | 101471931 A | 7/2009 |
| CN | 101572938 A | 11/2009 |
| CN | 101605299 A | 12/2009 |
| EP | 2858421 A1 | 4/2015 |
| WO | WO 2014/005330 A1 | 1/2014 |

OTHER PUBLICATIONS

International Search Report and Written Opinion dated Nov. 17, 2015 in connection with International Application No. PCT/CN2015/086862.

SERVICE DISCOVERY IN MULTI-MEDIUM COMMUNICATIONS NETWORKS

CROSS REFERENCE TO RELATED APPLICATIONS

This application is a continuation-in-part of and claims priority under 35 U.S.C. § 120 to U.S. patent application Ser. No. 14/915,642, filed Mar. 1, 2016, which is a national stage entry of International Application, PCT/CN2015/086862, filed Aug. 13, 2015, which claims priority under 35 U.S.C. § 119 to U.S. Provisional Application No. 62/036,636, filed on Aug. 13, 2014, and U.S. Provisional Application No. 62/037,117, filed on Aug. 14, 2014, entire contents of each of which is hereby incorporated by reference in its entirety.

TECHNICAL FIELD

The disclosed embodiments relate generally to wireless network communications, and, more particularly, to low power consumption service discovery in wireless communications systems.

BACKGROUND

IEEE 802.11 is a set of media access control (MAC) and physical layer (PHY) specification for implementing wireless local area network (WLAN) communication in the Wi-Fi (2.4, 3.6, 5, and 60 GHz) frequency bands. The 802.11 family consists of a series of half-duplex over-the-air modulation techniques that use the same basic protocol. The standards and amendments provide the basis for wireless network products using the Wi-Fi frequency bands. For example, IEEE 802.11n is an amendment that improves upon the previous IEEE 802.11 standards by adding multiple-input multiple-output antennas (MIMO). IEEE 802.11ac is an amendment to IEEE 802.11 that builds on 802.11n. Changes compared to 802.11n include wider channels (80 or 160 MHz versus 40 MHz) in the 5 GHz band, more spatial streams (up to eight versus four), higher-order modulation (up to 256-QAM vs. 64-QAM), and the addition of Multi-user MIMO (MU-MIMO). IEEE 802.11ad is an amendment that defines a new physical layer for 802.11 networks to operate in the 60 GHz millimeter wave spectrum. This frequency band has significantly different propagation characteristics than the 2.4 GHz and 5 GHz bands where Wi-Fi networks operate. IEEE 802.11ah defines a WLAN system operating at sub 1 GHz license-exempt bands. 802.11ah can provide improved transmission range compared with the conventional 802.11 WLANs operating in the 2.4 GHz and 5 GHz bands. 802.11ah can be used for various purposes including large-scale sensor networks, extended range hotspot, and outdoor Wi-Fi for cellular traffic offloading, whereas the available bandwidth is relatively narrow. IEEE 802.11ax is the successor to 802.11ac; it will increase the efficiency of WLAN networks. IEEE 802.11ax is currently at a very early stage of development and has the goal of providing 4.times. the throughput of 802.11ac.

As Wi-Fi technology increases in both technical complexity and a broadening feature set, there is a clear need for the industry to define and adopt a common platform where the interoperability of essential, underlying capabilities can be assured. Moreover, the industry and membership will benefit from the availability of a re-usable, modular platform that existing and future Wi-Fi Alliance programs can easily adopt. Wi-Fi Alliance Application Services Platform 2 (ASP2) program builds upon the ASP functionality originally defined in Wi-Fi Direct Services. The goal of the ASP2 is to define the required capabilities and corresponding test plan for the new functionality provided by ASP2.

The ASP functionality in Wi-Fi Peer-to-Peer (P2P) Services specification has defined a service discovery mechanism and connectivity using P2P. In current mobile communications networks, a service advertiser is not restricted to access point (AP). Any wireless station (STA) client can be a service advertiser. The service advertiser can never sleep as long as it provides service. As a result, when STA is being a service advertiser, the high power consumption becomes a main issue for the STA. A solution for service discovery with very low power consumption is sought.

SUMMARY

Some embodiments relate to a method, comprising: by a management device, accepting a first communications device to join a wireless communications network managed by the management device; registering, by the management device, a service provided by the first communications device, wherein the service is available in accordance with a set of service parameters including a schedule of availability, wherein the set of service parameters includes at least one parameter selected from the group consisting of a set of one or more starting times, a set of one or more service intervals, a set of one or more service periods, a set of one or more physical media, a set of one or more device identifiers, a set of one or more data sequence identifiers, and at least one medium access mode within the service interval; receiving, by the management device, a request from a second communications device seeking the service; and transmitting, to the second communication device, by the management device, the set of service parameters. The data may be exchanged between the first and the second communications devices to provide the service to the second communications device in accordance with the set of service parameters. The data may be exchanged between the first and the second communications devices directly or indirectly.

The set of service parameters may comprise the set of one or more physical media, and the second communications device may receive the service on the one or more physical media.

The set of service parameters may include an operating mode of the first communication device.

The operating mode may be an active mode or a power save mode.

The set of service parameters may include an indication of whether the first communications device is available to communicate with the second communications device.

The set of service parameters may include the at least one medium access mode, and the at least one medium access mode may comprise at least one access mode selected from the group consisting of a carrier sense multiple access mode, a clear channel assessment mode, and a trigger-based communication mode.

The management device may include one access point or a plurality of access points.

The management device may include one multi-medium communications device or a plurality of multi-medium communications devices.

The first communications device may be unavailable when entering a doze state of a power save mode in accordance with the schedule.

The first communications device may be unavailable when a distance from the second communications device is over a pre-defined range.

The management device may also transmit location information and ranging information of the first communications device to the second communications device.

The management device may exchange the set of service parameters with the second communications device on behalf of the first communications device.

The management device may forward a session request from the second communications device to the first communications device.

The set of service parameters may indicate that a physical medium is enabled or disabled.

When a first physical medium is disabled, the second communications device may receive the service using a second physical medium.

The request from the second communications device may request a concurrent transmission over a plurality of physical media and the service may be provided to the second communications device using the concurrent transmission when the set of service parameters indicates the service is available concurrently over the plurality of physical media.

The set of service parameters may include a parameter indicating a feedback mode for the synchronized transmission.

The parameter indicating the feedback mode may indicate feedback using a common acknowledgement technique or an independent acknowledgement technique.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
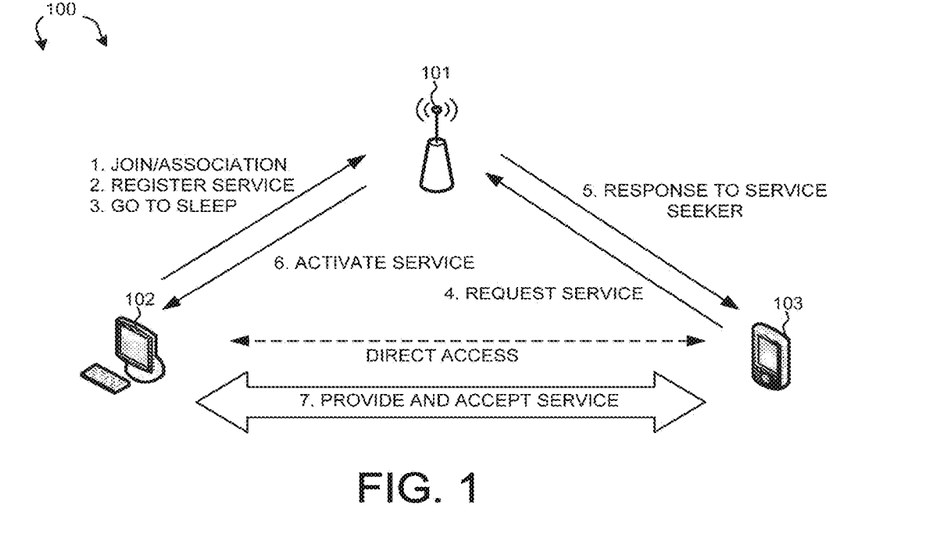
FIG. 1 illustrates a wireless communications system with enhanced service discovery in accordance with one novel aspect.

FIG. 1 illustrates a wireless communications network 100 with enhanced service discovery in accordance with one novel aspect. Wireless communications network 100 comprises an access point AP 101, a non-AP station STA 102, and another non-AP station STA 103. In such a wireless network, any mobile station may provide specific services such as Wi-Fi access, streaming, printing, gaming, while other mobile stations may seek for those specific services. Further, a mobile device may provide services to neighboring devices while receiving services from other neighboring devices.

In the example of FIG. 1, STA 102 is a service advertiser that provides a specific type of service. STA 103 is a service seeker that needs the specific type of service. STA 103 may try to access STA 102 directly for providing the service, as depicted by dashed line 111. STA 102, as a service advertiser, can never go to sleep to save power as long as it provides the service to other mobile devices in the network. This results in very high power consumption for STA 102. If STA 102 and STA 103 are personal mobile devices, then such high power consumption is to be avoided. On the other hand, AP 101 is a management entity for the wireless network, and AP 101 is always on to serve the network.

In accordance with one novel aspect, AP 101 can be used as a proxy agent to announce the service advertisement and service request on behalf of the other service advertisers and service seekers in the network. As illustrated in FIG. 1, in step 1, STA 102 joins the network and establishes a connection with AP 101. In step 2, STA 102 registers its service to AP 101. The registered service is associated with certain schedule (timetable) for service availability, as well as a set of service-related parameters. In step 3, STA 102 goes to sleep to save power. In step 4, STA 103 sends a request to AP 101 seeking the service. In step 5, AP 101 sends a response to STA 103 on behalf of STA 102. AP 101 may further exchange additional information with respect to the service, its availability, and associated parameters. In step 6, AP 101 sends a notice to STA 102 to wake up STA 102 and to activate the service. Finally, in step 7, STA 102 and STA 103 establishes a session connection according to a selected service portal. By using AP 101 as a proxy agent to advertise its service, STA 102 is able to save power consumption during non-service time.

Figure 2:
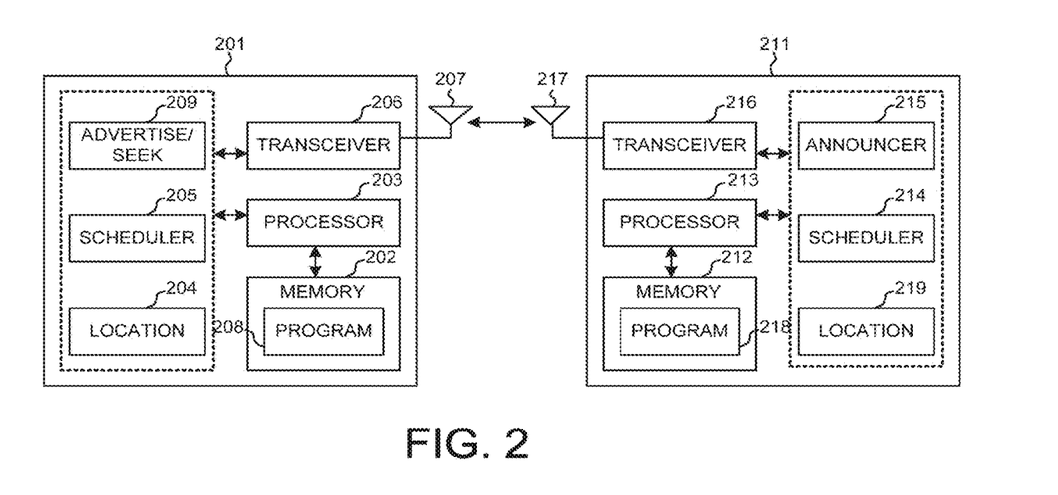
FIG. 2 is a simplified block diagram of a wireless transmitting device and a receiving device in accordance with one novel aspect.

FIG. 2 is a simplified block diagram of a mobile communications device 201 as a service advertiser or seeker and a mobile communications device 211 as a service announcer in accordance with a novel aspect. For wireless device 201, antenna 207 transmits and receives radio signals. RF transceiver module 206, coupled with the antenna, receives RF signals from the antenna, converts them to baseband signals and sends them to processor 203. RF transceiver 206 also converts received baseband signals from the processor, converts them to RF signals, and sends out to antenna 207. Processor 203 processes the received baseband signals and invokes different functional modules to perform features in wireless device 201. Memory 202 stores program instructions and data 208 to control the operations of the wireless device.

Similar configuration exists in wireless device 211 where antenna 217 transmits and receives RF signals. RF transceiver module 216, coupled with the antenna, receives RF signals from the antenna, converts them to baseband signals and sends them to processor 213. The RF transceiver 216 also converts received baseband signals from the processor, converts them to RF signals, and sends out to antenna 217. Processor 213 processes the received baseband signals and invokes different functional modules to perform features in wireless device 211. Memory 212 stores program instructions and data 218 to control the operations of the wireless device.

The wireless devices 201 and 211 also include several configurable functional circuitries and modules that are configured to carry out some embodiments of the present invention. The different functional modules can be implemented by software, firmware, hardware, or any combination thereof. The function modules, when executed by the processors 203 and 213 (e.g., via executing program codes 208 and 218), for example, allow device 201 to advertise or request certain services to its neighboring devices, and allow device 211 to announce service advertisements and needs for its neighboring devices. In one example, device 201 is a service advertiser. Device 201 sends a request to device 211 for advertising a service via advertising module 209. The service is scheduled in accordance with a first schedule via scheduler 205. Device 201 also provides its location information via location module 204. In another example, device 201 is a service seeker. Device 201 sends a request to device 211 for seeking a service via seeking module 209. The service is needed in accordance with a second schedule via scheduler 205. Upon receive the request, device 211 announces the request on behalf of device 201 such that other neighboring devices in the network are aware of the service provided or needed. More importantly, device 201 can go to power-saving mode and delegate the service advertisement/request to device 211, which may be an access point and is always on. As a result, power saving for device 201 can be achieved. Furthermore, AP 211 may forward location information and scheduling information related to the service such that the service is provided and accepted at the right place and the right time.

Figure 3:
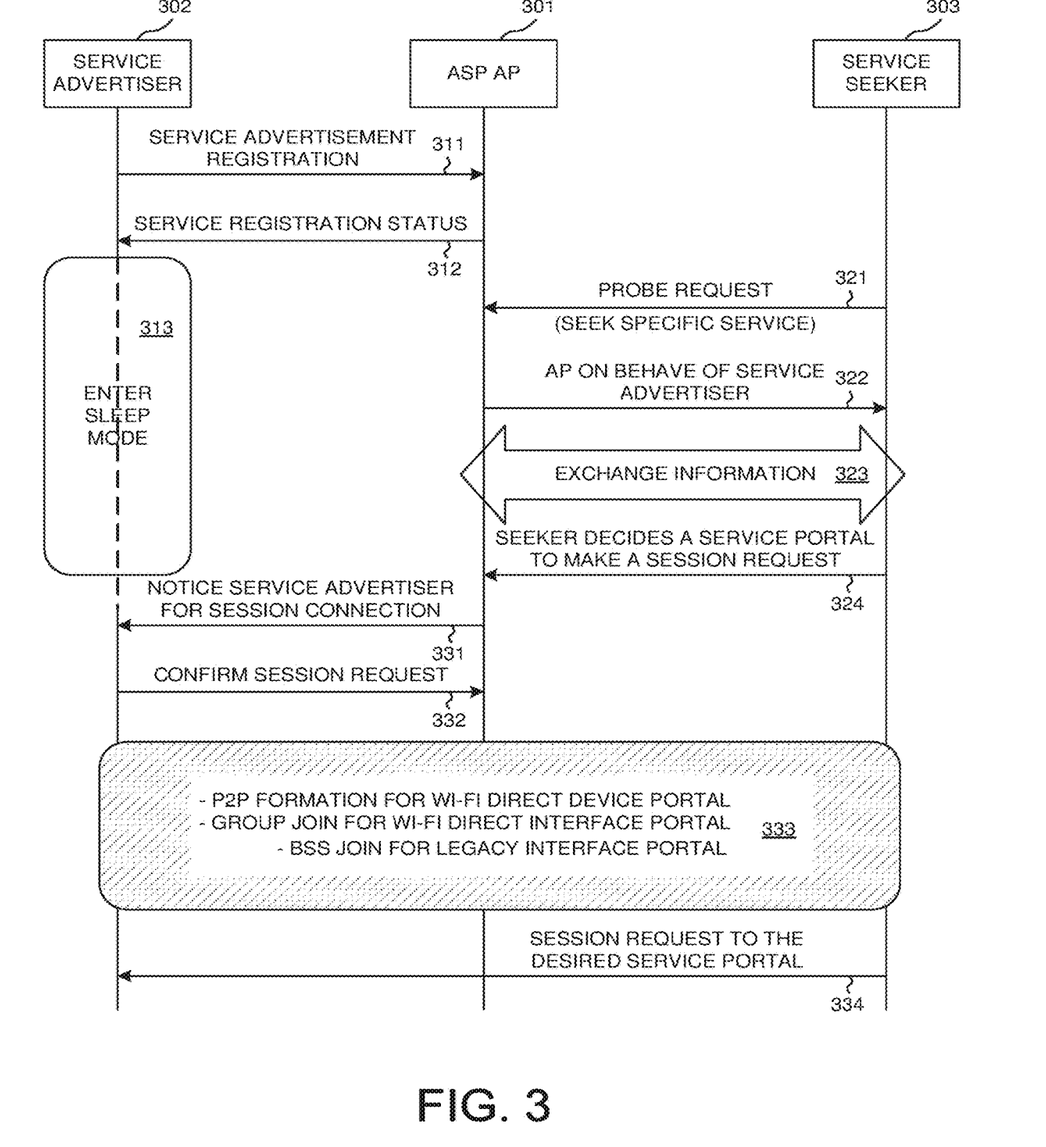
FIG. 3 is a signaling diagram of one embodiment of service discovery between an access point (AP STA) and two stations (non-AP STAs).

FIG. 3 is a signaling diagram of one embodiment of service discovery between an access point (AP STA 301) and two stations (non-AP STA 302 and STA 303). In the example of FIG. 3, STA 302 is a service advertiser that provides one or more specific services and STA 303 is a service seeker seeking one or more specific services. In step 311, STA 302 joins the wireless network managed by AP 301 and registers its service with AP 301. The service registration may involve sending service schedule and other parameters (e.g., speed, cost, quality, etc.) to AP 301. In step 312, AP 302 replies with a service registration status back to STA 302. Upon successful service registration, in step 313, STA 302 enters power save mode. During power saving, STA 302 may periodically listens to incoming messages, but does not actively provide any service to others.

In step 321, STA 303 sends a message (e.g., a probe request) to AP 301 seeking a specific service. Upon receiving the request, AP 301, on behalf of STA 302, sends a probe response back to STA 303 in step 322. The response may comprise the service availability and parameters of the service provided by STA 302. In an alternative example, AP 301 may sends service advertisement on behalf of STA 302 prior to receiving any request from STA 303. In step 323, AP 301 and STA 303 may further exchange or negotiate additional information related to the service. For example, STA 303 may send AP 301 its own availability and/or its desired schedule for receiving the service. In another example, AP 301 also provides scheduling information, location information, and ranging information with respect to the service provided by STA 302. If STA 302 and STA 303 are hidden from each other due to their physical distance, then by providing the location and ranging information, the service seeker (STA 303) may later move closer to the service advertiser (STA 302) for receiving the service. In yet another example, AP 301 may act as the proxy agent for multiple service advertisers that have registered their services. AP 301 thus may provide service-related information for all the service advertisers to STA 303. In step 324, STA 303 determines a service portal to make a session request based on the exchanged information. The service information allows STA 303 to select the connection method, forming a new group, or join existing one.

In step 331, AP 301 notifies STA 302 for the session request from STA 303. In one example, AP 301 notifies STA 302 as soon as AP 301 receives the session request from STA 303. In another example, AP 301 can wait until STA 303 exits sleep mode and is available for service based on its schedule. In step 332, STA 302 confirms the session request to AP 301 and wakes up according to the service portal type and connection method. According to different service portal type, as depicted by box 333, different operations may be applied including: P2P formation for Wi-Fi Direct Device Portal, Group join for Wi-Fi Direct Interface Portal, or BSS join for legacy interface portal. In step 334, STA 303 sends a session request to the desired service portal.

Figure 4:
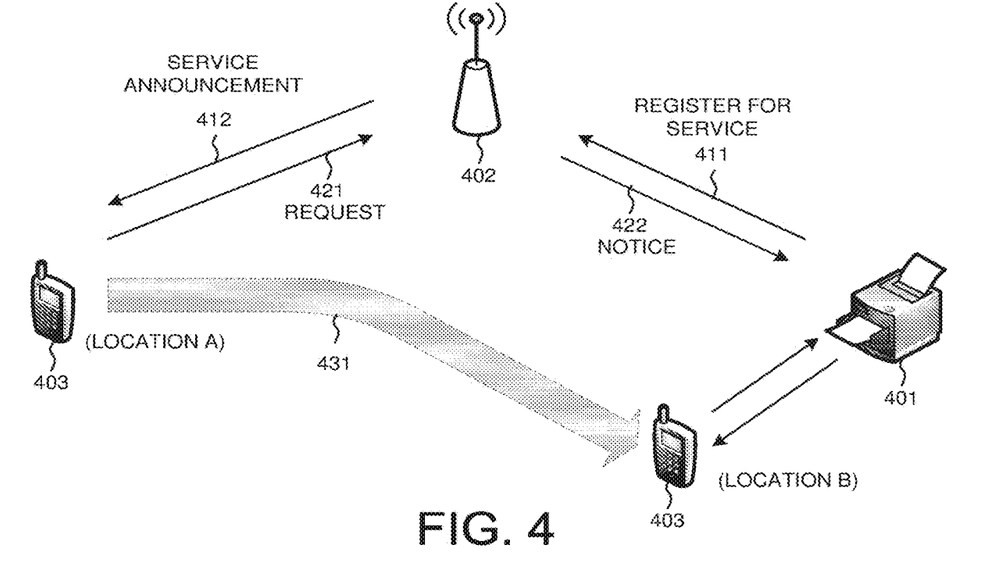
FIG. 4 illustrates one example of enhanced service discovery using an access point.

FIG. 4 illustrates one example of enhanced service discovery using an access point (AP). In the example of FIG. 4, device 401 is a service advertiser, e.g., providing photo printing service. Device 403 is a service subscriber, e.g., seeking photo printing service. Device 402 is an access point. In one advantageous aspect, device 401 and device 403 are devices with very low power consumption, and utilizes AP 402 as a proxy agent for efficient service discovery. For example, device 401 registers the service with AP 402 and enters sleep mode with long sleep window (as depicted by line 411). On the other hand, AP 402 is always on. AP 402 is then used as a proxy agent to announce the service advertisement for device 401 (as depicted by line 412).

In one scenario, AP 402 continues to act as a proxy agent for device 401 and device 403. AP 402 receives service request from device 402 (as depicted by line 421), exchanges service information with device 402 on behalf of device 401, and forwards a session request to device 401 (as depicted by line 422) on behalf of device 403 when device 403 decides the service portal type and connection method. Device 401 then wakes up to respond to the session request and provides service to device 403 accordingly. In another scenario, device 401 can simply wake up based on its schedule for service, and device 403 can also send the session request directly to device 401 based on the schedule information received from AP 402. As a result, devices 401 and 403 can remain very low power consumption while still able to have fast service discovery and session connection setup.

In another advantageous aspect, device 401 and device 403 are located beyond the reach of radio signals from each other and thus are hidden from each other. On the other hand, AP 402 is located in between the two devices and are able to transmit and receive radio signals to/from both of the devices. AP 402 is then used as a proxy agent to announce the service advertisement for device 401 (as depicted by 411 and 412), or announce the service request for device 403 (as depicted by 421 and 422). AP 402 also provides scheduling information, location information, and ranging information with respect to the service provided by device 401. Later on, device 403 can move from its original location (Location A) to a new location (Location B) that is closer to device 401 at a scheduled service time (as depicted by 431). As a result, the maximum service advertising range is twice longer and coverage is four-times larger.

Figure 5:
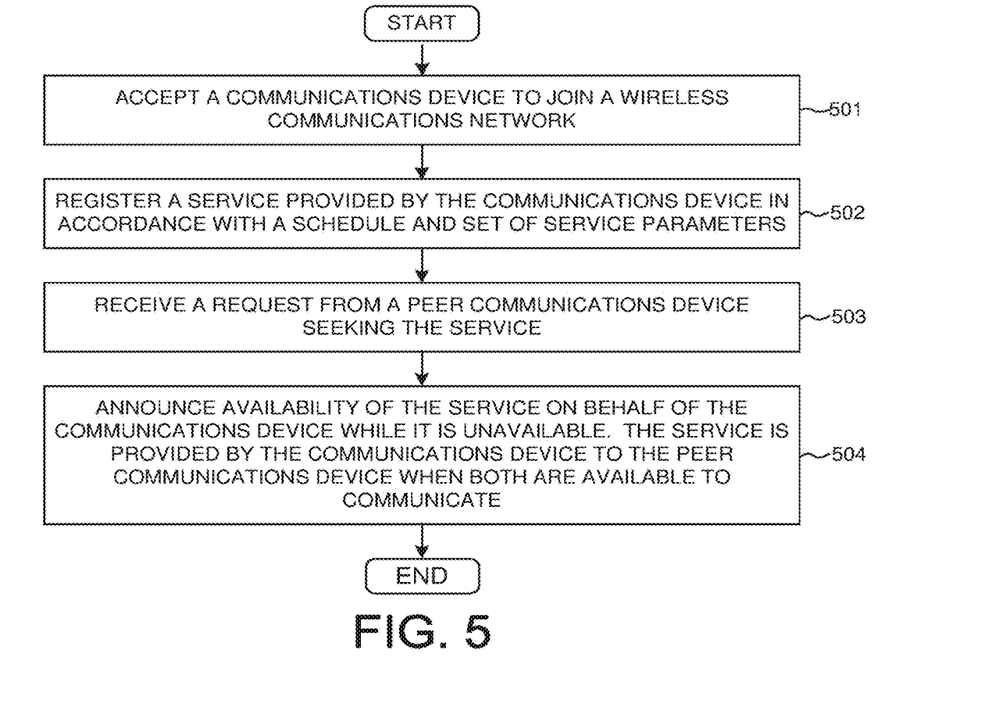
FIG. 5 is flow chart of a method of enhanced service discovery from access point perspective in accordance with a novel aspect.

FIG. 5 is flow chart of a method of enhanced service discovery from access point perspective in accordance with a novel aspect. In step 501, an access point (AP) accepts a communications device to join a wireless communications network. In step 502, the AP registers a service provided by the communications device. The service is available in accordance with a schedule and a set of service parameters. In step 503, the AP receives a request from a peer communications device seeking the service. In step 504, the AP announces availability of the service on behalf of the communications device while the communications device is unavailable. The service is later provided by the communications device to the peer communications device when both devices are available to communicate. In one embodiment, the communications device is unavailable when entering power save mode in accordance with the schedule. The AP announce the service availability with the scheduling information to the peer communications device. In another embodiment, the communications device is unavailable when a distance from the peer communications device is over a pre-defined range. The AP transmits location information and ranging information of the communications device to the peer communications device. Once the peer communications device determines a desired service portal and connection type, the AP then forwards a notice to the communication device to wake up and establish a session connection with the peer communications device.

Figure 6:
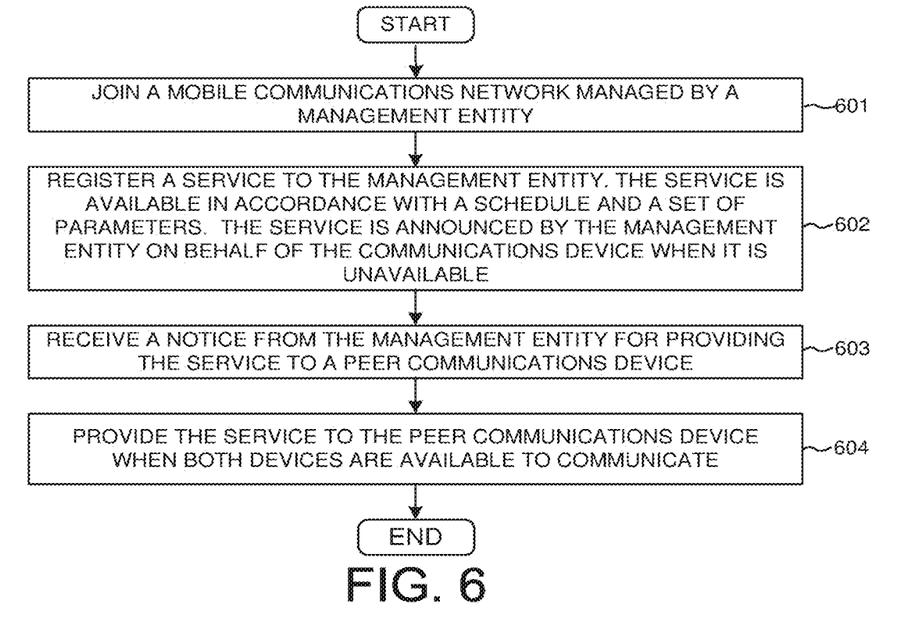
FIG. 6 is flow chart of a method of enhanced service discovery from service advertiser perspective in accordance with a novel aspect.

FIG. 6 is flow chart of a method of enhanced service discovery from service advertiser perspective in accordance with a novel aspect. In step 601, a communications device joins a mobile communications network managed by a management entity. In step 602, the communications device registers a service to the management entity. The service is available in accordance with a schedule and a set of service parameters. The service is announced by the management entity on behalf of the communications device when the communications device is unavailable. In step 603, the communications device receives a notice from the management entity for providing the service to a peer communications device. In step 604, the communications device provides service to the peer communications device when both devices are available to communicate.

Figure 7:
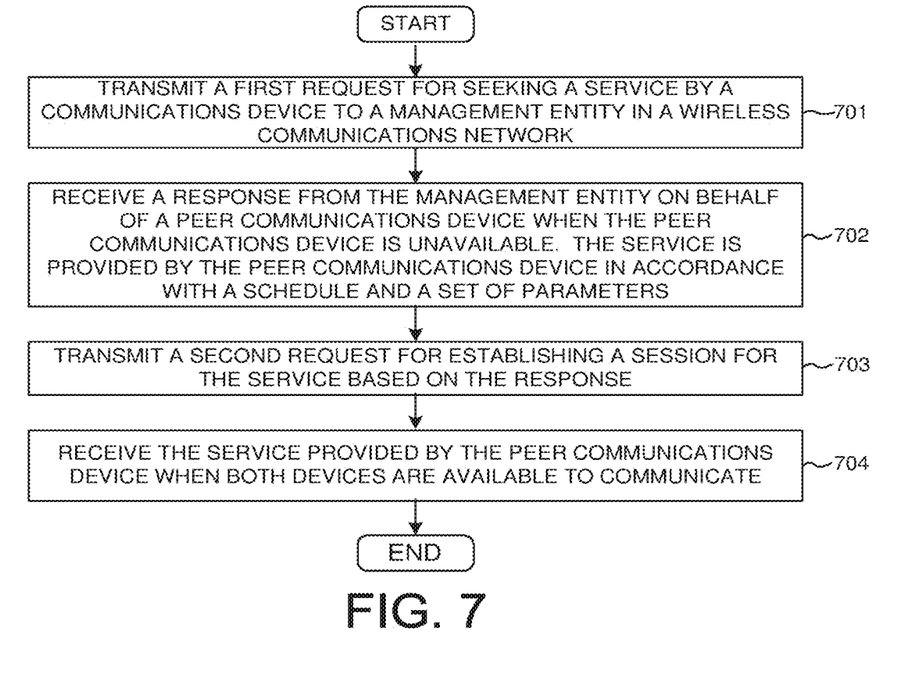
FIG. 7 is flow chart of a method of enhanced service discovery from service seeker perspective in accordance with a novel aspect.

FIG. 7 is flow chart of a method of enhanced service discovery from service seeker perspective in accordance with a novel aspect. In step 701, a communications device transmits a first request for seeking a service to a management entity in a wireless communications network. In step 702, the communications device receives a response from the management entity on behalf of a peer communications device when the peer communications device is unavailable. The service is provided by the peer communications device in accordance with a schedule and a set of parameters. In step 703, the communications device transmits a second request for establishing a session for the service based on the response. In step 704, the communications device receives the service provided by the peer communications device when both devices are available to communicate.

Figure 8:
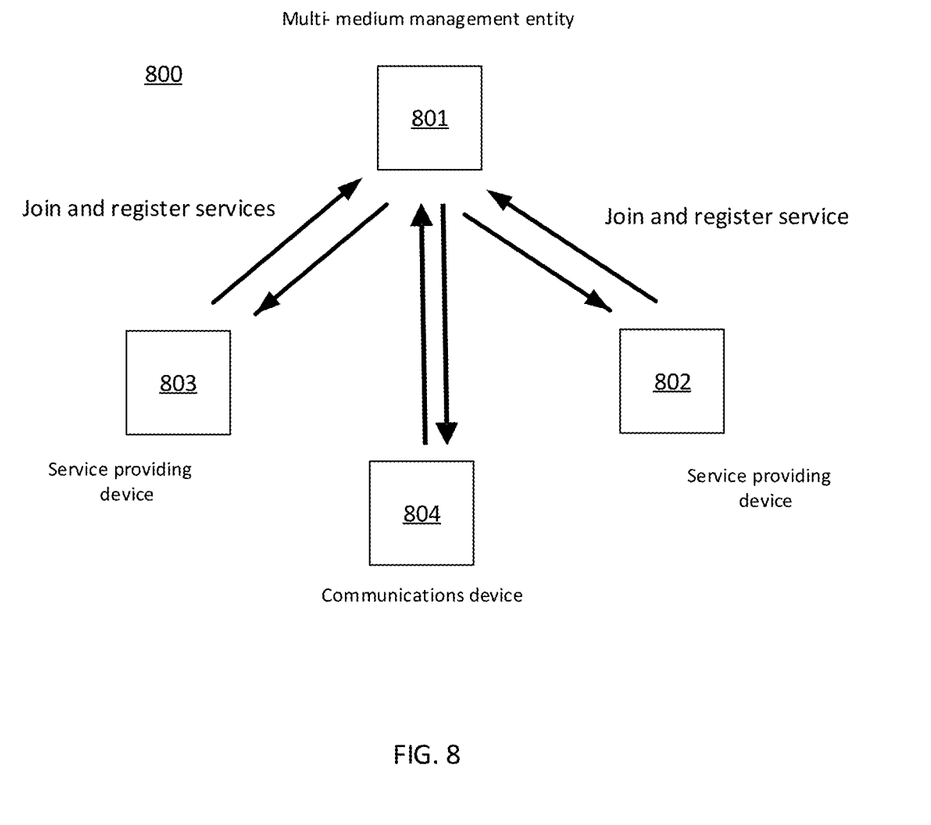
FIG. 8 shows an example of a multi-medium network, according to some embodiments.

FIG. 8 shows an example of a multi-medium network 800, according to some embodiments. A multi-medium network includes communications devices capable of communicating over more than one physical medium. Examples of physical media include different frequency bands or channels for wireless communication, e.g., wireless local area network (WLAN) communication, such as the Wi-Fi (2.4, 3.6, 5, and 60 GHz) frequency bands, for example. A multi-medium network may have the benefit of allowing services to be provided through one or more physical media. The multi-medium network 800 includes a multi-medium management entity 801 capable of communicating through a plurality of physical media. In some embodiments, the multi-medium management entity 801 may be one multi-medium communications device or a plurality of multi-medium communication devices, such as one access point (AP) or a plurality of APs. In some embodiments, a management device may include a plurality of access points (e.g., a 5 GHz AP and a 6 GHz AP). The multi-medium network 800 also includes service providing devices 802 and/or 803. Service providing devices 802 and/or 803 may be any devices that provide a service through the multi-medium network 800. In some embodiments, service providing devices 802 and/or 803 may be (AP or non-AP) service providing stations. Service providing devices 802 and/or 803 may be mobile devices or stationary devices. Examples of services provided by service providing devices 802 and/or 803 may include Wi-Fi access, streaming, printing and gaming services. Accordingly, service providing devices 802 and/or 803 may be any of a variety of service providing devices such as a mobile station, a printer or gaming device, by way of example. This is solely by way of example, as the techniques described herein are not limited as to the types of services that may be provided or particular types of devices that provide the service. The multi-medium network 800 also includes a communications device 804 that may receive a service from the service providing devices 802 and/or 803. Communications device 804 may be any type of device that can receive a service over the multi-medium network 800, such as a smart phone, a tablet, a computer, a display, a wearable computing device, etc.

An example of a method of providing a service within a multi-medium network will now be described with reference to FIG. 9. A first communication device, such as service providing device 802, may join the multi-medium network in step 901. The first communications device may register its service to the management entity 801 in step 902.

The service is available in accordance with a set of service parameters, such as a schedule of availability of the service. Alternatively or additionally, the set of service parameters may include a set of service starting times, a set of service intervals, a set of service periods, a set of service protocols, a set of one or more physical media, a set of one or more device identifiers, a set of one or more data sequence identifiers, and/or a set of medium access modes within the service interval. As used herein, the term "set" with reference to a service parameter refers "one or more service parameters," and is not limited to a plurality of service parameters, though often a plurality of service parameters may be provided. By way of further explanation, the set of service starting times may be one or more times at which the service will be available. The set of service intervals may be one or more time windows during which the service is available. The set of service periods may be the period of the service interval (e.g., the time between the start of successive service windows). The set of service protocols may be wireless radio communication protocols for providing the service, examples of which include multiband operation protocol, location protocol and service discovery protocol. The set of one or more physical media may include a frequency or band identifier, by way of example. The set of one or more device identifiers may identify a device to provide the service and/or to identify the management device(s). The set of one or more data sequence identifiers may specify the data sequence that is allowed within the service time window (e.g., to indicate they belong to the same data stream/packet). The set of medium access modes may include one or more access modes such as a carrier sense multiple access (CSMA) mode, a clear channel assessment (CCA) mode, and a trigger-based communication mode. The one or more service parameters may be registered with the management entity 801 in step 902. For example, the service providing device 802 may transmit the one or more service parameters to the management entity 801. The management entity 801 may then store the one or more service parameters in step 902 in a non-transitory computer-readable storage medium. In step 903, the management entity 801 may receive a request from a second communication device (e.g., communications device 804) for the service provided by the first communications device. The request may be received by the management entity 801 when the first communications device is available or not available. In step 904, the management entity may send one or more of the service parameters to the second communications device. In step 905, the second communications device receives the service from the first communications device in accordance with the service parameters. In some embodiments, the second communications device may select one or more available service parameters for receiving the service, such as a physical medium, service interval, or another service parameter. The first communications device may provide the service directly to the second communications device through wireless communication or indirectly to the second communications device (e.g., through the management entity 801).

Figure 10:
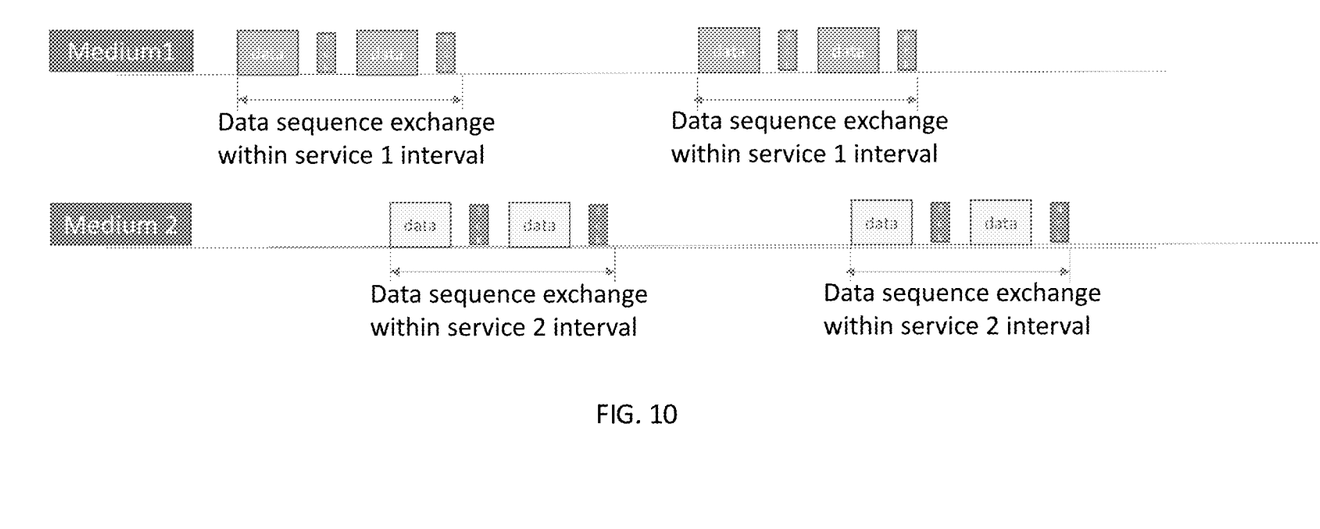
FIG. 10 shows an example illustrating two different services being provided by two different service providing devices.

FIG. 10 shows an example illustrating two different services being provided by two different service providing devices. For example, as illustrated in FIG. 8. A first service providing device 802 may provide a first service and a second service providing device 803 may provide a second service. The services may be provided on the same physical medium (e.g., at different times) or on different physical media. FIG. 10 illustrates an example in which the two services are provided on different physical media. As illustrated in FIG. 10, service 1 may be provided on medium 1 during a first service interval and service 2 may be provided on medium 2 during a second service interval. The first and second service intervals may be overlapping or non-overlapping. The two services may be provided to the same communications device 804 or to different communications devices. During a service interval, data (e.g., frames) may be exchanged between the service providing device and the communications device that receives the service. Data may be acknowledged with ACK responses, as illustrated in FIG. 10.

Figure 9:
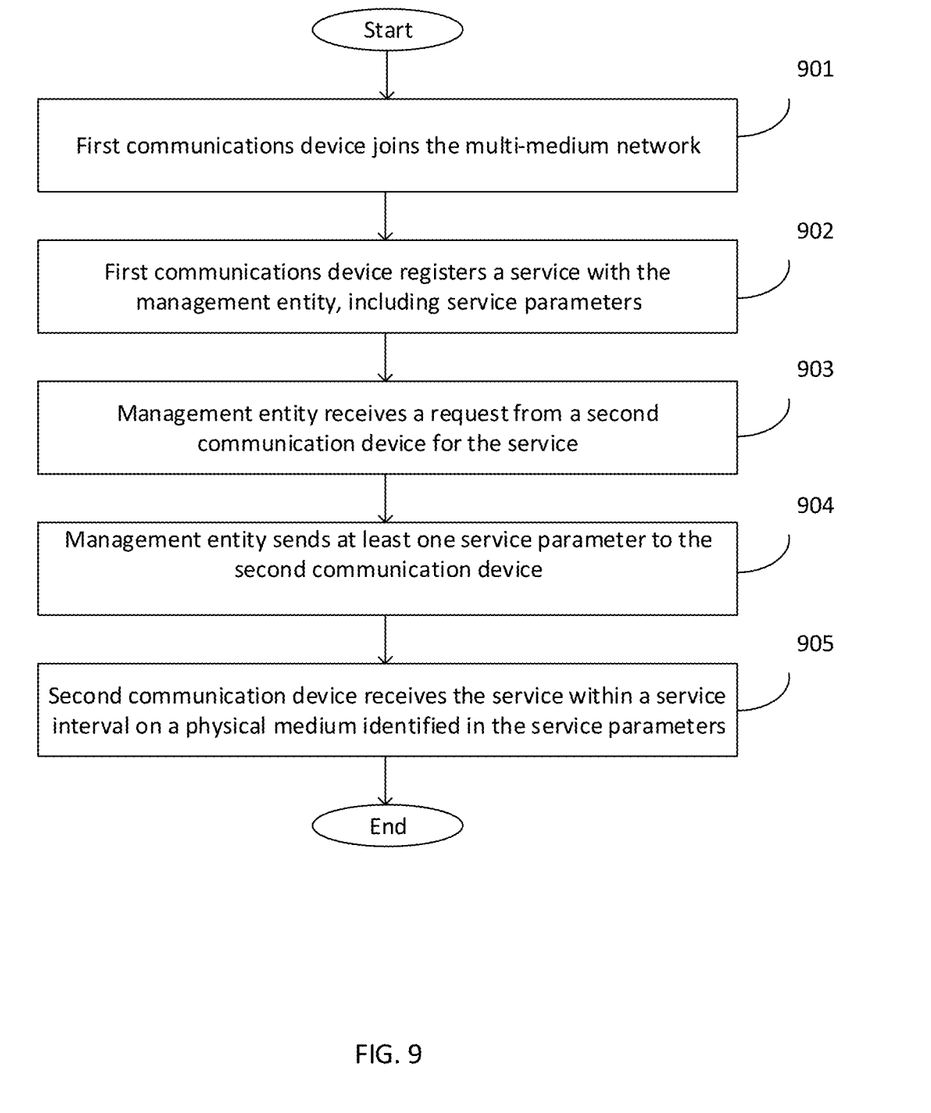
FIG. 9 shows an example of a method of providing a service within a multi-medium network.
Figure 11:
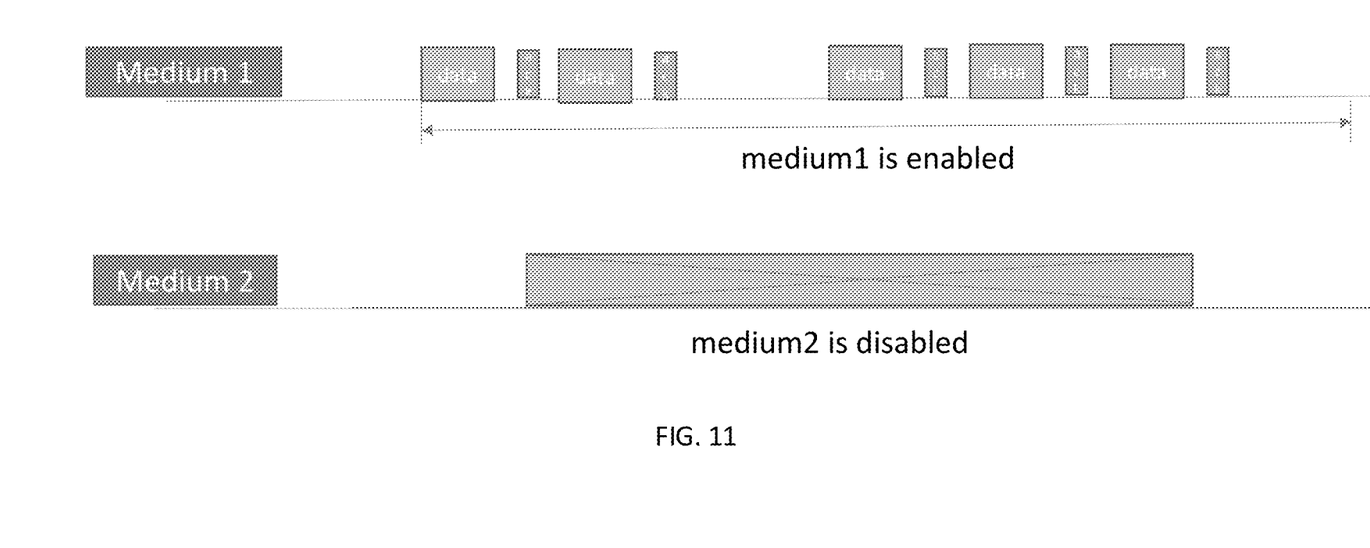
FIG. 11 illustrates a scenario in which physical medium 1 is enabled and physical medium 2 is disabled.

Returning to discussion of FIG. 9, in some embodiments the service parameter(s) provided from the management entity to the second communications device in step 904 may include an indication as to whether a physical medium is enabled or disabled. Prior to sending the information, a determination as to which physical media are enabled or disabled may be made by the management entity 801 and stored by the management entity 801. A physical medium may be enabled at certain times and disabled at certain times. In step 905, the second communication device may receive the indication as to which physical media are enabled or disabled and proceeds with communicating with the first communication device to receive the service through an enabled physical medium. FIG. 11 illustrates a scenario in which physical medium 1 is enabled and physical medium 2 is disabled. In step 905 the second communications device may determine that medium 2 is disabled and that medium 1 is enabled, and proceed with communicating with the first communications device to receive the service through medium 1.

Figure 12:
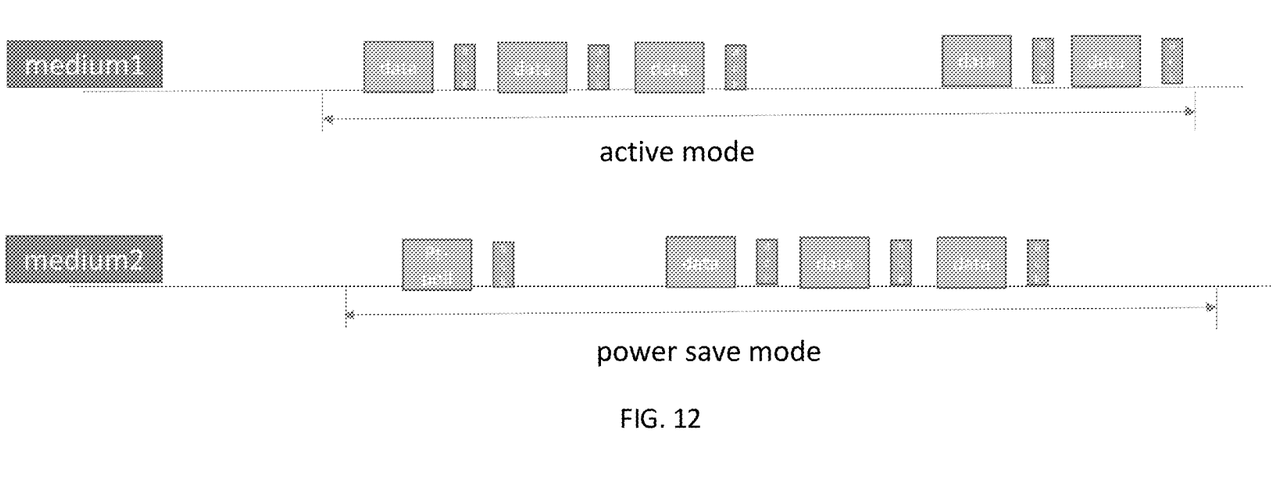
FIG. 12 illustrates an example of communications over a medium 1 in an active mode and medium 2 in a power save mode.

Returning again to discussion of FIG. 9, in some embodiments the first communications device (e.g., service providing device 802 or 803) enters a power save mode after step 901. Service parameters for the power save mode may be registered with the management entity in step 902. For example, a service parameter may be registered indicating the first communications device is in a power save mode. The first communications device may provide services with different parameters in the power save mode as compared to an active mode. For example, services may be provided with a longer period between service intervals or may only be provided on a certain physical medium. In step 904, service parameters such as a power save mode indication, and/or other service parameters may be sent to the second communications device. In step 905, the second communications device receives the service parameters and receives the service in accordance with a power save state indication. FIG. 12 illustrates an example of communications over a medium 1 in an active mode and medium 2 in a power save mode.

As an example, when a non-AP station enters a power save mode, it can have one of two states: an awake state or a doze state. The management entity 801 is not allowed to send data to the station when the station is in the power save mode unless the station is in the awake state. The management entity 801 may periodically send traffic indications to the station. The station will monitor the traffic indications only during periodic intervals. Once the station receives a traffic indication it will switch to the awake state and sent a packet ps-poll to the management entity 801 to inform the management entity 801 that it is awake. Then the management entity 801 will send the buffered data to the station. If the station is in an active mode the management entity can send data to the station at any time.

In some embodiments a service providing device may provide concurrent transmission of a service over a plurality of physical media. Returning to discussion of FIG. 9, in some embodiments the first communications device may register the parameters of a service in step 902, such as an indication whether the first communications device supports concurrent transmission on different media. If concurrent transmission on different media is supported, a parameter may be registered indicating whether the same data is transmitted on different media or different data is transmitted on different media. Providing the same data on different media may provide transmission diversity, as the data may be received via either medium. In some cases, the data may be transmitted over both media in a synchronized manner, in which the data are transmitted at the same time and/or transmissions end at the same time. In some cases different data may be transmitted on different media. Providing different data on different media may increase data throughput by utilizing a plurality of media.

Figure 13A:
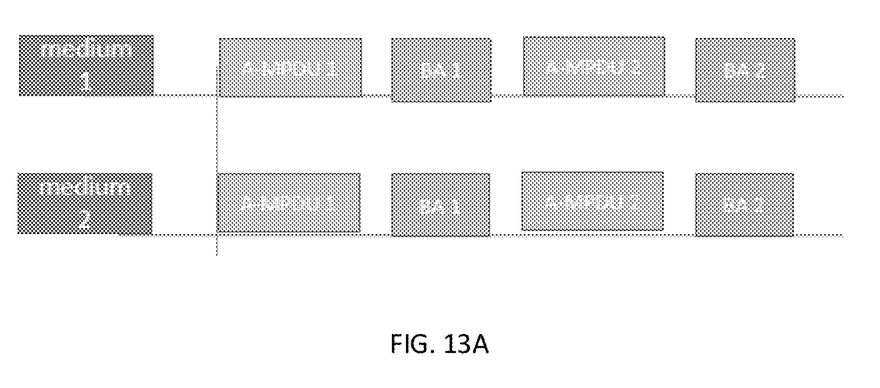
FIGS. 13A and 13B illustrate an example of communications using the synchronized transmission mode with feedback using a "common acknowledgement" mode and an "independent acknowledgement" mode, respectively.
Figure 13B:
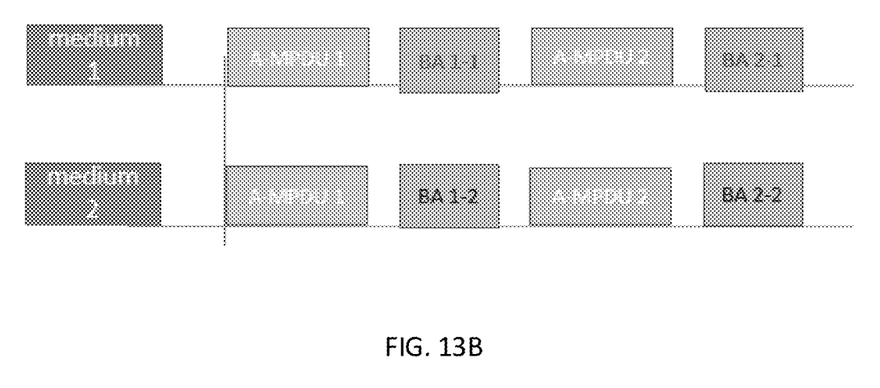

In some embodiments, when a communications device supports concurrent transmission of data on different media, a parameter may be registered indicating a feedback technique for the communication in step 902. The feedback technique may be "common acknowledgement" or "independent acknowledgement." FIG. 13A illustrates an example of communications using concurrent transmission. As shown in FIG. 13A, the same data is transmitted at the same time over different physical media, which may provide transmission diversity. When a "common acknowledgement" feedback technique is used, the second communications device may combine the correctly received MAC PDUs in each A-MPDU on both media and send a common acknowledgement on each corresponding medium, as illustrated in FIG. 13A, where the same acknowledgements BA1, BA2, etc. are sent on both media. Each transmission is an A-MPDU (aggregated medium access control (MAC) protocol data unit (PDU). When an "independent acknowledgement" feedback technique is used, the second communications device may acknowledge the data (received A-MPDU) independently on each physical medium, as illustrated in the example of FIG. 13B. The management entity 801 may combine the acknowledgement information from the two physical media when using the independent acknowledgement feedback technique.

In step 903 the management entity may receive a request from the second communication device for the service using concurrent transmission with a feedback technique. In step 904 the management entity may send the service parameters to the second communication device. In step 905, the second communications device receives the service using the concurrent transmission and provides acknowledgements using the appropriate feedback technique.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   by a management device, accepting a first communications device to join a wireless communications network managed by the management device;
   registering, by the management device, a service provided by the first communications device, wherein the service is available in accordance with a set of service parameters including a schedule of availability, wherein the set of service parameters includes at least one parameter selected from the group consisting of a set of one or more starting times, a set of one or more service intervals, a set of one or more service periods, a set of one or more physical media, a set of one or more device identifiers, a set of one or more data sequence identifiers, and at least one medium access mode within the set of one or more service intervals;
   receiving, by the management device, a request from a second communications device seeking the service; and
   transmitting, to the second communications device, by the management device, the set of service parameters;
   wherein data is exchanged between the first and the second communications devices to provide the service to the second communications device in accordance with the set of service parameters, and wherein the data is exchanged between the first and the second communications devices directly or indirectly,
   wherein the set of service parameters includes the at least one medium access mode, and the at least one medium access mode comprises at least one access mode selected from the group consisting of a carrier sense multiple access mode, a clear channel assessment mode, and a trigger-based communication mode.

2. The method of claim 1, wherein the set of service parameters comprises the set of one or more physical media, and the second communications device receives the service on the set of one or more physical media.

3. The method of claim 1, wherein the set of service parameters includes an operating mode of the first communications device.

4. The method of claim 3, wherein the operating mode is an active mode or a power save mode.

5. The method of claim 1, wherein the set of service parameters includes an indication of whether the first communications device is available to communicate with the second communications device.

6. The method of claim 1, wherein the management device includes one access point or a plurality of access points.

7. The method of claim 1, wherein the management device includes one multi-medium communications device or a plurality of multi-medium communications devices.

8. The method of claim 1, wherein the first communications device is unavailable when entering a doze state of a power save mode in accordance with the schedule.

9. The method of claim 1, wherein the first communications device is unavailable when a distance from the second communications device is over a pre-defined range.

10. The method of claim 1, wherein the management device also transmits location information and ranging information of the first communications device to the second communications device.

11. The method of claim 1, wherein the management device exchanges the set of service parameters with the second communications device on behalf of the first communications device.

12. The method of claim 1, wherein the management device forwards a session request from the second communications device to the first communications device.

13. The method of claim 1, wherein the set of service parameters indicates that a physical medium is enabled or disabled.

14. The method of claim 1, wherein when a first physical medium is disabled, the second communications device receives the service using a second physical medium.

15. A method, comprising:
   by a management device, accepting a first communications device to join a wireless communications network managed by the management device;
   registering, by the management device, a service provided by the first communications device, wherein the service is available in accordance with a set of service parameters including a schedule of availability, wherein the set of service parameters includes at least one parameter selected from the group consisting of a set of one or more starting times, a set of one or more service intervals, a set of one or more service periods, a set of one or more physical media, a set of one or more device identifiers, a set of one or more data sequence identifiers, and at least one medium access mode within the set of one or more service intervals;

receiving, by the management device, a request from a second communications device seeking the service; and transmitting, to the second communications device, by the management device, the set of service parameters;

wherein data is exchanged between the first and the second communications devices to provide the service to the second communications device in accordance with the set of service parameters, and wherein the data is exchanged between the first and the second communications devices directly or indirectly, wherein the request from the second communications device requests a concurrent transmission over a plurality of physical media and the service is provided to the second communications device using the concurrent transmission when the set of service parameters indicates the service is available concurrently over the plurality of physical media.

16. The method of claim 15, wherein the set of service parameters includes a parameter indicating a feedback mode for the concurrent transmission.

17. The method of claim 16, wherein the parameter indicating the feedback mode indicates feedback using a common acknowledgement technique or an independent acknowledgement technique.

18. The method of claim 15, wherein the set of service parameters includes the at least one medium access mode, and the at least one medium access mode comprises at least one access mode selected from the group consisting of a carrier sense multiple access mode, a clear channel assessment mode, and a trigger-based communication mode.

19. The method of claim 1, wherein the at least one medium access mode comprises the carrier sense multiple access mode.

20. The method of claim 1, wherein the at least one medium access mode comprises the clear channel assessment mode.

21. The method of claim 1, wherein the at least one medium access mode comprises the trigger-based communication mode.

* * * * *